Dec. 26, 1922.
W. W. WHEELER.
CONVERTIBLE FARMING IMPLEMENT.
FILED OCT. 11, 1920.
1,440,323.
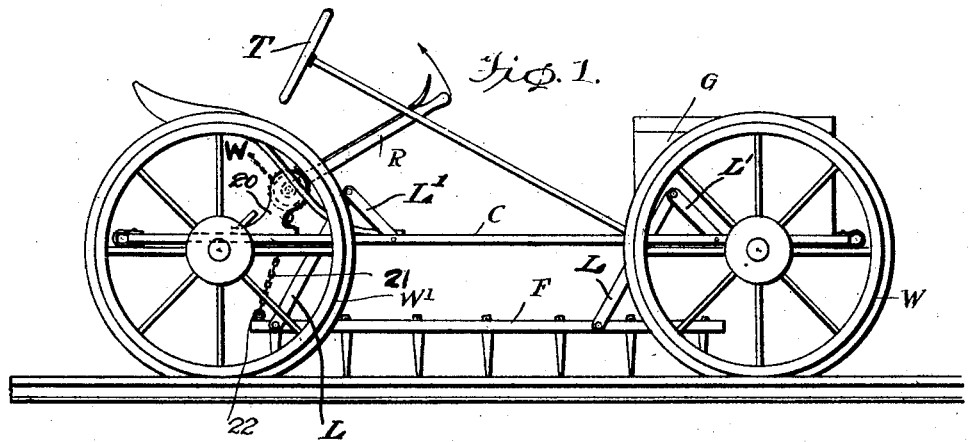
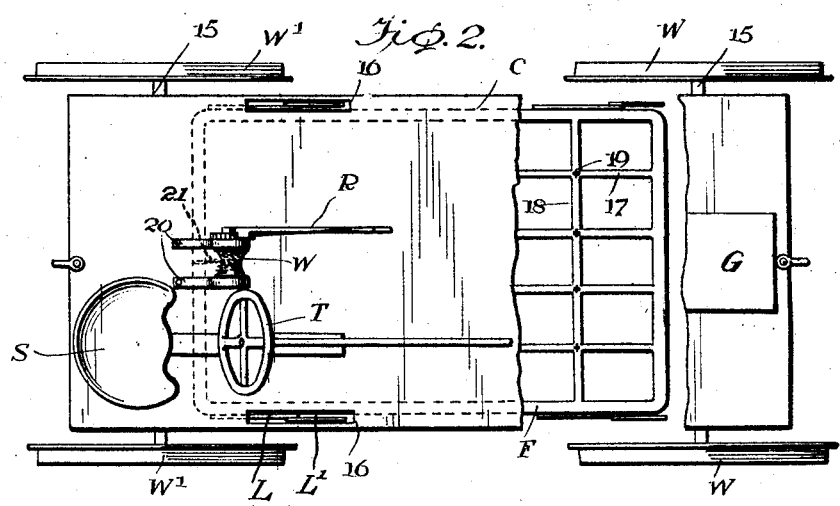
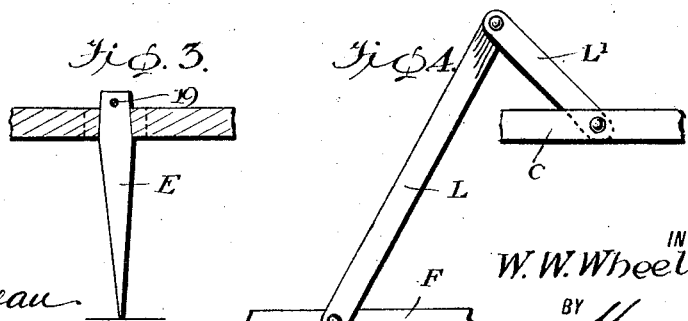
WITNESSES
INVENTOR
W. W. Wheeler,
BY
ATTORNEYS Patented Dec. 26, 1922.

1,440,323

UNITED STATES PATENT OFFICE.

WILLIAM WILLIS WHEELER, OF JACKSONVILLE, FLORIDA.

CONVERTIBLE FARMING IMPLEMENT.

Application filed October 11, 1920. Serial No. 416,004.

*To all whom it may concern:*

Be it known that I, WILLIAM WILLIS WHEELER, a citizen of the United States, and a resident of Jacksonville, in the county of Duval and State of Florida, have invented certain new and useful Improvements in Convertible Farming Implements, of which the following is a specification.

My invention relates to farming implements and the purpose of my invention is the provision of a farming implement having interchangeable working elements to permit of its being converted with facility and dispatch into a plow, cultivator or any other form of farming implement whereby a single farming implement can be used to perform the necessary operations in the planting, cultivating and gathering of crops.

My invention is particularly adapted, although not necessarily, to the system of planting, cultivating and gathering of crops embodied in my pending application Serial No. 387,219, filed June 7, 1920, and is designed to be moved over the tracks of such system in effecting a proper working of the soil and crops.

I will describe one form of convertible farming implement embodying my invention, and will then point out the novel features thereof in claims.

In the accompanying drawings:

Figure 1 is a view showing in side elevation one form of farming implement embodying my invention in position upon a track.

Figure 2 is a top plan view of the implement shown in Figure 1 with a portion of the chassis broken away.

Figure 3 is a fragmentary detailed view showing the manner in which one of the working elements is secured on the frame of the implement.

Figure 4 is an enlarged detail view showing one of the connections between the chassis and the frame of the implement.

Similar reference characters refer to similar parts in each of the several views.

Referring specifically to the drawings and particularly to Figures 1 and 2, C designates the chassis of the implement which is supported at points adjacent its opposite ends upon axles 15 carrying wheels W and W'. All of the wheels W and W' are flanged as shown so as to permit of the movement of the implement over the rails of a track. The wheels W constitute the steering wheels of the implement when the latter is used without the track. The chassis C is of rectangular form as shown in Figure 2 and is provided along its longitudinal edges with slots 16 through which supporting means for a frame F are adapted to extend. The frame F in the present instance is of rectangular outline and is provided with intersecting beams 17 and 18. At the points of intersection the beams 17 and 18 are formed with openings for the reception of one of the elements E in the manner clearly shown in Figure 3. The upper ends of the elements E are tapered in length and the openings in the beams 17 and 18 are similarly tapered so as to effect a snug fitting of the elements within the openings. Accidental displacement of the openings is prevented by means of pins 19 which are applied in the manner shown in Figures 2 and 3.

As shown in Figure 1, the frame F is disposed beneath the chassis C and is capable of being lowered so as to cause the working elements E to engage the soil or crops or to be elevated from such position so as to cause the elements to disengage the soil or crops. The movement of the frame F to either of these positions is effected by means of links L removably and pivotally connected at their lower ends to the side portions of the frame F in the manner shown. The upper ends of the links L are pivotally connected to shorter links L' and the opposite ends of the latter links are in turn pivotally supported within the slots 16 of the chassis C. This form of suspension means permits of the lowering or elevation of the frame F, it being understood that because of the pivotal connection between the links L and L' vertical movement of the frame is allowed.

For effecting the vertical movement of the frame F I provide a windlass W supported upon brackets 20 secured to the upper side of the chassis C. A chain or other flexible member 21 is trained about the windlass with one end secured thereto while its opposite end extends through a suitable opening formed in the chassis C and is secured to a ring 22 carried by the rear end of the frame F. A lever R is provided for manually actuating the windlass and a conventional form of pawl and ratchet means is provided for locking the windlass in any adjusted position.

As shown in Figure 2, the lever R is disposed adjacent an operator's seat S while a steering wheel T is located adjacent the latter so as to permit of the operator steering the implement, as will be understood.

In operation, the implement is self-propelled by an engine designated at G although it is to be understood that the implement can be moved over the rails of a track in any other suitable manner such as by attaching the same to a tractor. As the implement moves over the tracks the operator by moving the lever R downwardly causes the frame to be lowered thereby allowing the working elements E to engage the soil or crops. In the present instance, the working elements E are shown as harrow teeth, but it is to be understood that any form of working elements can be used upon the frame depending upon what particular step in the planting, cultivating or gathering of crops is being performed. The frame F as a unit may be detached from the implement and another frame substituted carrying the particular working elements required. It will thus be seen that by substituting the proper working elements the complete planting, cultivating and gathering of crops can be effected with the one implement. When it is desired to render the implement inactive the operator elevates the lever R thereby causing a winding of the chain 21 about the windlass W so as to effect an elevation of the frame F through the medium of the links L and L'.

Should it be desired to use the implement over a field not provided with tracks, it will be clear that the wheels W and W' can be employed as the flanges would not interfere with the passage of the implement over the soil. When so using the implement the steering wheel T is manipulated to effect a steering of the entire implement.

Although I have herein shown and described only one form of convertible farming implement embodying my invention, it is to be understood that various changes and modifications may be made herein without departing from the spirit of the invention and the spirit and scope of the appended claims.

What I claim is:

1. A convertible farming implement comprising, a chassis having slots formed therein, a frame disposed beneath the chassis, ground working elements carried by the frame, links connected to the frame, other links connected to the chassis and to the first links, a windlass on the chassis, a chain connected to the frame at one end and trained about the windlass, a lever for actuating the windlass, and means for propelling the implement.

2. A convertible implement of the character described, comprising a running gear, a frame disposed beneath said running gear carrying ground working elements, a foldable link connection between each corner of the frame and the running gear, said foldable link connection in each instance, comprising a short link extending upwardly and having its one end pivotally connected to the running gear and a longer link having its one end connected to the free end of the short link, and its other end pivotally connected to the frame carrying the ground working elements, and means for adjustably raising and lowering said frame with relation to the running gear.

3. A convertible farming implement, comprising a running gear, a platform supported thereby, a frame carrying a plurality of ground working elements disposed beneath the platform, a foldable link connection extending between each corner of the frame and the platform, said foldable link connection, in each instance, comprising a link having its one end pivotally connected to the platform and extending upwardly, a second link passing through an elongated slot in the platform and having its upper end pivotally connected to the free end of the first named link and its lower end pivotally connected to the frame, and means for adjustably raising and lowering said frame carrying the ground working elements.

WILLIAM WILLIS WHEELER.